Feb. 14, 1928.
C. S. RICKER
1,659,373
VAPORIZING MANIFOLD
Filed Oct. 13, 1920
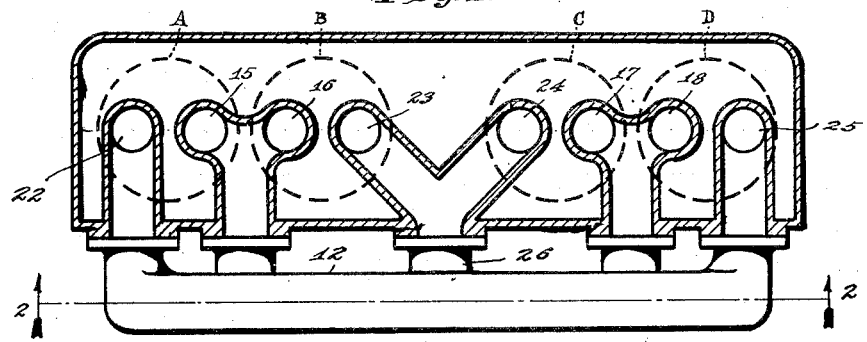
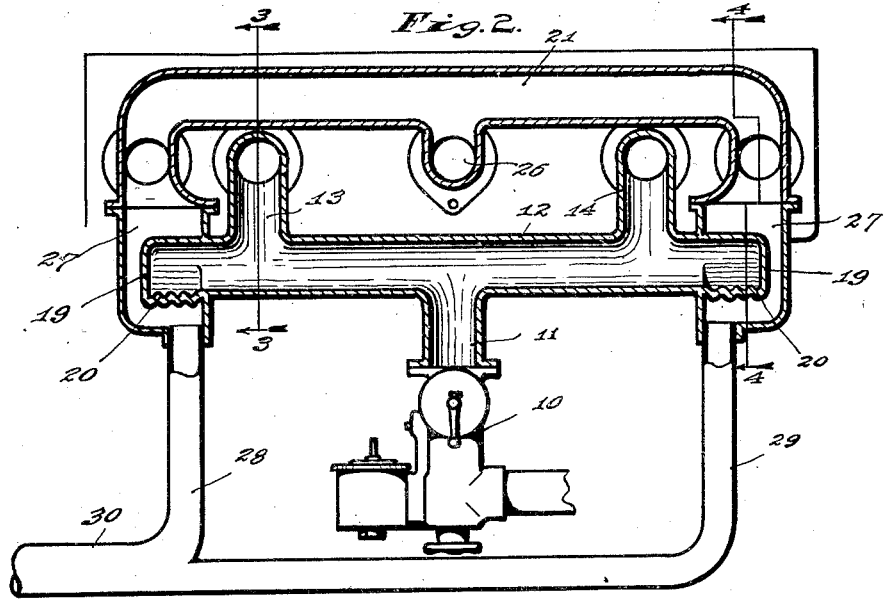
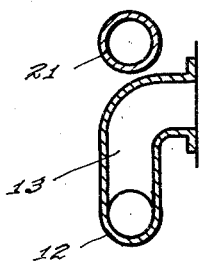
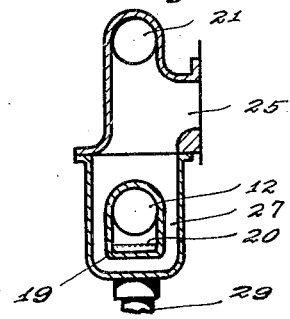
INVENTOR
Chester S. Ricker,
BY
Hood&Ashley.
ATTORNEYS Patented Feb. 14, 1928.

1,659,373

UNITED STATES PATENT OFFICE.

CHESTER S. RICKER, OF INDIANAPOLIS, INDIANA.

VAPORIZING MANIFOLD.

Application filed October 13, 1920. Serial No. 416,673.

It is the object of my invention to produce a vaporizing manifold, which will vaporize by heat those component parts of the fuel which are not volatilized in the carbureter, but which will not heat the air.

It is well recognized that much liquid in the ordinary fuel supply system for internal combustion engines will be carried into the cylinders; because it is not volatilized in the carbureter. It is also recognized that it is undesirable to heat the air which forms part of the explosive mixture, because to do so cuts down the power of the engine.

In carrying out my invention, I use an intake manifold which branches to different cylinders of the engine, with the branches preferably directly opposite, so that in the engine operation there is a surging to and fro in the manifold, and I extend the ends of the manifold beyond the outermost connections from the manifold to the cylinders, so that by reason of such surging any still-liquid fuel will be carried past such connections and deposited in the extended ends of the manifold; and I heat these extended manifold ends in some suitable manner, preferably by providing them with jackets in the connections from the exhaust ports of the end cylinders to the exhaust manifold.

The accompanying drawing illustrates my invention. Fig. 1 is a plan of a manifolding system embodying my invention, in connection with a four-cylinder engine, showing the cylinders in dotted lines; Fig. 2 is a vertical section on the line 2—2 of Fig. 1; Fig. 3 is a transverse vertical section on the line 3—3 of Fig. 2; and Fig. 4 is a transverse vertical section on the line 4—4 of Fig. 2.

Any usual carbureter 10 is connected to the central intake opening 11 of the intake manifold 12, which preferably extends in opposite directions, in a single straight line, from the middle point where the intake opening is located. Near the ends of the straight manifold 12 are connections 13 and 14, each of which leads to a pair of intake ports, 15 and 16, and 17 and 18, respectively, in the engine cylinders, of which in the arrangement shown there are four, A, B, C, and D. The straight manifold 12 is provided at each end with an extension 19, which extends beyond the connection 13 or 14 leading to the intake ports. Though it is not essential, the under side of each extension 19 is preferably provided with transverse ribs 20, to provide pockets for catching the liquid fuel which may enter the ends 19 and increasing the heating surface.

An exhaust manifold 21 is connected to the several exhaust ports 22, 23, 24, and 25 of the engine cylinders, the ports 23 and 24 of the middle cylinders conveniently communicating with the exhaust manifold by a common connection 26. Each end of the exhaust manifold 21 communicates with a chamber 27, which surrounds and jackets the adjacent extended end 19 of the intake manifold. The two jackets 19 are connected, on the opposite side thereof from their connections to the exhaust manifold, to two exhaust pipes 28 and 29, which may or may not join into a single exhaust pipe.

In operation, the usual engine suction draws in air and fuel through the carbureter 10, and the mixture passes by way of the intake opening 11 to the middle of the straight intake manifold 12, whence it passes alternately toward one end and the other of the manifold as the successive cylinders in their firing order reach their suction strokes. This alternate passage of the explosive mixture to one end or the other of the intake manifold 12 produces a surging of such mixture along the intake manifold, and by reason of such surging the unvolatilized liquid fuel by reason of its greater weight is carried by inertia past the connections 13 and 14 leading to the cylinder intake ports and is thrown into the extended ends 19, where it is precipitated in the depressions between the ridges 20. The burned gases from the exhaust manifold 21 circulate through the chambers 27 in their passage to the exhaust pipes 28 and 29, and heat such end portions 19 to vaporize the liquid fuel therein, probably with some cracking action also on such liquid fuel, but do not heat materially the air of the mixture stream. The fuel thus vaporized works back into the body of the manifold 12, both by reason of the expansion due to such vaporization and by reason of the surging in such manifold, and being vaporized is carried with the stream of explosive mixture into the connections 13 and 14 leading to the cylinders.

I claim as my invention:

1. In combination, a substantially straight intake manifold having a mixture-supply connection at an intermediate point and having discharge connections near the ends to the ports of engine cylinders, said intake manifold having end portions projecting beyond such discharge connections to form pockets in which unvaporized fuel is deposited, an exhaust manifold connected to the exhaust ports of the engine cylinders, and jackets surrounding the extended end portions of the intake manifold and connected to the respective ends of said exhaust manifold to form escape passages therefrom.

2. In combination, an intake manifold having a mixture-supply connection at an intermediate point and having discharge connections near the ends to the ports of engine cylinders, said intake manifold having end portions projecting beyond such discharge connections to form pockets in which unvaporized fuel is deposited, an exhaust manifold connected to the exhaust ports of the engine cylinders, and jackets surrounding the extended end portions of the intake manifold and connected to the respective ends of said exhaust manifold to form escape passages therefrom.

In witness whereof, I have hereunto set my hand at Indianapolis, Indiana, this 4th day of September, A. D. one thousand nine hundred and twenty.

CHESTER S. RICKER.